US007978716B2

(12) United States Patent
Rao et al.

(10) Patent No.: US 7,978,716 B2
(45) Date of Patent: Jul. 12, 2011

(54) SYSTEMS AND METHODS FOR PROVIDING A VPN SOLUTION

(75) Inventors: Goutham P. Rao, San Jose, CA (US); Robert Rodriguez, San Jose, CA (US); Eric Brueggemann, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 302 days.

(21) Appl. No.: 12/336,795

(22) Filed: Dec. 17, 2008

(65) Prior Publication Data
US 2009/0158418 A1 Jun. 18, 2009

Related U.S. Application Data

(63) Continuation of application No. 10/988,004, filed on Nov. 12, 2004, now Pat. No. 7,496,097.

(60) Provisional application No. 60/524,999, filed on Nov. 24, 2003.

(51) Int. Cl.
H04L 12/28 (2006.01)
(52) U.S. Cl. ........... 370/401; 370/392; 370/352; 726/12
(58) Field of Classification Search .................. None
See application file for complete search history.

(56) References Cited

U.S. PATENT DOCUMENTS

| 5,623,492 A | 4/1997 | Teraslinna |
| 5,812,668 A | 9/1998 | Weber |
| 5,819,020 A | 10/1998 | Beeler, Jr. |
| 5,835,726 A | 11/1998 | Shwed et al. |
| 5,850,446 A | 12/1998 | Berger et al. |
| 5,889,863 A | 3/1999 | Weber |
| 5,931,917 A | 8/1999 | Nguyen et al. |
| 5,943,424 A | 8/1999 | Berger et al. |
| 5,956,483 A | 9/1999 | Grate et al. |
| 5,958,016 A | 9/1999 | Chang et al. |

(Continued)

FOREIGN PATENT DOCUMENTS
CN 1394042 1/2003
(Continued)

OTHER PUBLICATIONS

International Search Report for PCT/US2005/026300, Mailing date: Dec. 16, 2005. 3 pages.

(Continued)

*Primary Examiner* — Duc C Ho
(74) *Attorney, Agent, or Firm* — Foley and Lardner LLP; Christopher McKenna

(57) ABSTRACT

A system, apparatus and a method for implementing a secured communications link at a layer other than that at which packets are filtered are disclosed. In one embodiment, a computer system is configured to form a virtual private network ("VPN") and comprises an address inspection driver to identify initial target packet traffic addressed to a target server. Also, the computer system includes a pseudo server module to receive rerouted initial target packet traffic from the address inspection driver. The pseudo server module is configured to convey packet regeneration instructions to a VPN gateway. The address inspection driver functions to identify additional target packet traffic addressed to the target server and routes the additional target packet traffic to the pseudo server. In one embodiment, the pseudo server is configured to strip header information from the additional target packet traffic to form a payload, and thereafter, to route the payload to the target.

20 Claims, 6 Drawing Sheets

U.S. PATENT DOCUMENTS

| | | | |
|---|---|---|---|
| 5,978,840 A | 11/1999 | Nguyen et al. |
| 5,983,208 A | 11/1999 | Haller et al. |
| 5,987,132 A | 11/1999 | Rowney |
| 5,996,076 A | 11/1999 | Rowney et al. |
| 5,999,525 A | 12/1999 | Krishnaswamy et al. |
| 6,002,767 A | 12/1999 | Kramer |
| 6,023,724 A | 2/2000 | Bhatia et al. |
| 6,026,379 A | 2/2000 | Haller et al. |
| 6,026,440 A | 2/2000 | Shrader et al. |
| 6,058,250 A | 5/2000 | Harwood et al. |
| 6,061,796 A | 5/2000 | Chen et al. |
| 6,067,569 A | 5/2000 | Khaki et al. |
| 6,072,870 A | 6/2000 | Nguyen et al. |
| 6,101,543 A | 8/2000 | Alden et al. |
| 6,112,085 A | 8/2000 | Garner et al. |
| 6,119,105 A | 9/2000 | Williams |
| 6,131,120 A | 10/2000 | Reid |
| 6,163,772 A | 12/2000 | Kramer et al. |
| 6,173,325 B1 | 1/2001 | Kukreja |
| 6,178,409 B1 | 1/2001 | Weber et al. |
| 6,182,139 B1 | 1/2001 | Brendel |
| 6,219,669 B1 | 4/2001 | Haff et al. |
| 6,236,652 B1 | 5/2001 | Preston et al. |
| 6,253,027 B1 | 6/2001 | Weber et al. |
| 6,253,327 B1 | 6/2001 | Zhang et al. |
| 6,272,556 B1 | 8/2001 | Gish |
| 6,282,172 B1 | 8/2001 | Robles et al. |
| 6,289,382 B1 | 9/2001 | Bowman-Amuah |
| 6,304,915 B1 | 10/2001 | Nguyen et al. |
| 6,308,273 B1 | 10/2001 | Goertzel et al. |
| 6,321,337 B1 | 11/2001 | Reshef et al. |
| 6,324,525 B1 | 11/2001 | Kramer et al. |
| 6,327,242 B1 | 12/2001 | Amicangioli et al. |
| 6,332,163 B1 | 12/2001 | Bowman-Amuah |
| 6,333,931 B1 | 12/2001 | LaPier et al. |
| 6,339,832 B1 | 1/2002 | Bowman-Amuah |
| 6,345,239 B1 | 2/2002 | Bowman-Amuah |
| 6,363,363 B1 | 3/2002 | Haller et al. |
| 6,373,950 B1 | 4/2002 | Rowney |
| 6,412,000 B1 | 6/2002 | Riddle et al. |
| 6,427,132 B1 | 7/2002 | Bowman-Amuah |
| 6,434,568 B1 | 8/2002 | Bowman-Amuah |
| 6,434,618 B1 | 8/2002 | Cohen et al. |
| 6,434,628 B1 | 8/2002 | Bowman-Amuah |
| 6,438,127 B1 | 8/2002 | Le Goff et al. |
| 6,438,594 B1 | 8/2002 | Bowman-Amuah |
| 6,442,571 B1 | 8/2002 | Haff et al. |
| 6,442,748 B1 | 8/2002 | Bowman-Amuah |
| 6,452,915 B1 | 9/2002 | Jorgensen |
| 6,452,923 B1 | 9/2002 | Gerszberg et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,484,206 B2 | 11/2002 | Crump et al. |
| 6,496,481 B1 | 12/2002 | Wu et al. |
| 6,496,776 B1 | 12/2002 | Blumberg et al. |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,553,377 B1 | 4/2003 | Eschelbeck et al. |
| 6,571,282 B1 | 5/2003 | Bowman-Amuah |
| 6,574,688 B1 | 6/2003 | Dale et al. |
| 6,578,068 B1 | 6/2003 | Bowman-Amuah |
| 6,584,569 B2 | 6/2003 | Reshef et al. |
| 6,590,588 B2 | 7/2003 | Lincke et al. |
| 6,594,690 B2 | 7/2003 | Cantwell |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,522 B1 | 8/2003 | Zheng et al. |
| 6,611,822 B1 | 8/2003 | Beams et al. |
| 6,611,867 B1 | 8/2003 | Bownman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensens |
| 6,640,249 B1 | 10/2003 | Bowman-Amuah |
| 6,662,221 B1 | 12/2003 | Gonda et al. |
| 6,671,818 B1 | 12/2003 | Mikurak |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,700,902 B1 | 3/2004 | Meyer |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,760,748 B1 | 7/2004 | Hakim |
| 6,766,373 B1 | 7/2004 | Beadle et al. |
| 6,792,615 B1 | 9/2004 | Rowe et al. |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,894,981 B1 | 5/2005 | Coile et al. |
| 6,904,449 B1 | 6/2005 | Quinones |
| 6,907,546 B1 | 6/2005 | Haswell et al. |
| 6,918,113 B2 | 7/2005 | Patel et al. |
| 6,920,502 B2 | 7/2005 | Araujo et al. |
| 6,944,279 B2 | 9/2005 | Elsey et al. |
| 6,954,736 B2 | 10/2005 | Menninger et al. |
| 6,954,877 B2 | 10/2005 | Earl et al. |
| 6,957,186 B1 | 10/2005 | Guheen et al. |
| 6,980,962 B1 | 12/2005 | Arganbright et al. |
| 6,990,480 B1 | 1/2006 | Burt |
| 6,996,628 B2 | 2/2006 | Keane et al. |
| 6,996,631 B1 | 2/2006 | Aiken, Jr. et al. |
| 7,000,012 B2 | 2/2006 | Moore et al. |
| 7,010,300 B1 | 3/2006 | Jones et al. |
| 7,013,290 B2 | 3/2006 | Ananian et al. |
| 7,023,979 B1 | 4/2006 | Wu et al. |
| 7,026,954 B2 | 4/2006 | Slemmer et al. |
| 7,028,333 B2 | 4/2006 | Tuomenoksa et al. |
| 7,028,334 B2 | 4/2006 | Tuomenoksa |
| 7,031,314 B2 | 4/2006 | Craig et al. |
| 7,036,142 B1 | 4/2006 | Zhang et al. |
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |
| 7,047,279 B1 | 5/2006 | Beams et al. |
| 7,047,424 B2 | 5/2006 | Bendinelli et al. |
| 7,054,837 B2 | 5/2006 | Hoffman et al. |
| 7,054,944 B2 | 5/2006 | Tang et al. |
| 7,072,665 B1 | 7/2006 | Blumberg et al. |
| 7,072,843 B2 | 7/2006 | Menninger et al. |
| 7,080,041 B2 | 7/2006 | Nagel |
| 7,085,854 B2 | 8/2006 | Keane et al. |
| 7,092,370 B2 | 8/2006 | Jiang et al. |

| | | |
|---|---|---|
| 7,096,009 B2 | 8/2006 | Mousseau et al. |
| 7,100,195 B1 | 8/2006 | Underwood |
| 7,103,068 B1 | 9/2006 | Gardner et al. |
| 7,107,285 B2 | 9/2006 | von Kaenel et al. |
| 7,113,779 B1 | 9/2006 | Fujisaki et al. |
| 7,114,180 B1 | 9/2006 | DeCaprio |
| 7,120,596 B2 | 10/2006 | Hoffman et al. |
| 7,120,690 B1 | 10/2006 | Krishnan et al. |
| 7,124,101 B1 | 10/2006 | Mikurak |
| 7,124,442 B2 | 10/2006 | Nash-Putnam |
| 7,130,792 B2 | 10/2006 | Tokieda et al. |
| 7,130,807 B1 | 10/2006 | Mikurak |
| 7,135,991 B2 | 11/2006 | Slemmer et al. |
| 7,136,645 B2 | 11/2006 | Hanson et al. |
| 7,140,044 B2 | 11/2006 | Redlich et al. |
| 7,143,153 B1 | 11/2006 | Black et al. |
| 7,146,644 B2 | 12/2006 | Redlich et al. |
| 7,149,698 B2 | 12/2006 | Guheen et al. |
| 7,149,897 B2 | 12/2006 | Chincheck et al. |
| 7,152,047 B1 | 12/2006 | Nagel |
| 7,152,092 B2 | 12/2006 | Beams et al. |
| 7,155,518 B2 | 12/2006 | Forslow |
| 7,165,041 B1 | 1/2007 | Guheen et al. |
| 7,171,379 B2 | 1/2007 | Menninger et al. |
| 7,181,766 B2 | 2/2007 | Bendinelli et al. |
| 7,188,273 B2 | 3/2007 | Allen et al. |
| 7,191,252 B2 | 3/2007 | Redlich et al. |
| 7,194,761 B1 | 3/2007 | Champagne |
| 7,197,751 B2 | 3/2007 | Fedotov et al. |
| 7,206,811 B2 | 4/2007 | Skurikhin et al. |
| 7,216,173 B2 | 5/2007 | Clayton et al. |
| 7,219,127 B2 | 5/2007 | Huck et al. |
| 7,221,660 B1 | 5/2007 | Simonson et al. |
| 7,222,305 B2 | 5/2007 | Teplov et al. |
| 7,225,244 B2 | 5/2007 | Reynolds et al. |
| 7,228,459 B2 | 6/2007 | Jiang et al. |
| 7,260,617 B2 | 8/2007 | Bazinet et al. |
| 7,260,840 B2 | 8/2007 | Swander et al. |
| 7,321,906 B2 | 1/2008 | Green |
| 7,340,772 B2 | 3/2008 | Panasyuk et al. |
| 7,353,533 B2 | 4/2008 | Wright et al. |
| 7,363,347 B2 | 4/2008 | Thomas |
| 7,398,552 B2 | 7/2008 | Pardee et al. |
| 7,415,723 B2 * | 8/2008 | Pandya .......................... 726/13 |
| 7,420,992 B1 | 9/2008 | Fang et al. |
| 7,512,702 B1 | 3/2009 | Srivastava et al. |
| 2001/0030970 A1 | 10/2001 | Wiryaman et al. |
| 2001/0037387 A1 | 11/2001 | Gilde et al. |
| 2001/0047406 A1 | 11/2001 | Araujo et al. |
| 2001/0049717 A1 | 12/2001 | Freeman et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0098840 A1 | 7/2002 | Hanson et al. |
| 2002/0099940 A1 | 7/2002 | Wana |
| 2002/0101860 A1 | 8/2002 | Thornton et al. |
| 2002/0126675 A1 | 9/2002 | Yoshimura et al. |
| 2002/0138572 A1 | 9/2002 | Delany et al. |
| 2002/0138618 A1 | 9/2002 | Szabo |
| 2002/0152373 A1 | 10/2002 | Sun et al. |
| 2002/0152423 A1 | 10/2002 | McCabe |
| 2002/0176532 A1 | 11/2002 | McClelland et al. |
| 2002/0184224 A1 | 12/2002 | Haff et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0046586 A1 | 3/2003 | Bheemarasetti et al. |
| 2003/0046587 A1 | 3/2003 | Bheemarasetti et al. |
| 2003/0055962 A1 | 3/2003 | Freund et al. |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0112809 A1 | 6/2003 | Bharali et al. |
| 2003/0112823 A1 | 6/2003 | Collins et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0149899 A1 | 8/2003 | Boden et al. |
| 2003/0177389 A1 | 9/2003 | Albert et al. |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212776 A1 | 11/2003 | Roberts et al. |
| 2003/0217126 A1 | 11/2003 | Polcha et al. |
| 2003/0223418 A1 | 12/2003 | Desai et al. |
| 2003/0229718 A1 | 12/2003 | Tock et al. |
| 2004/0006708 A1 | 1/2004 | Mukherjee et al. |
| 2004/0031058 A1 | 2/2004 | Reisman |
| 2004/0034794 A1 | 2/2004 | Mayer et al. |
| 2004/0039827 A1 | 2/2004 | Thomas et al. |
| 2004/0044521 A1 | 3/2004 | Chen et al. |
| 2004/0049515 A1 | 3/2004 | Haff et al. |
| 2004/0078772 A1 | 4/2004 | Balay et al. |
| 2004/0087304 A1 | 5/2004 | Buddhikot et al. |
| 2004/0100976 A1 | 5/2004 | Chang et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0141525 A1 | 7/2004 | Bhushan et al. |
| 2004/0143734 A1 | 7/2004 | Buer et al. |
| 2004/0177158 A1 | 9/2004 | Bauch et al. |
| 2004/0205439 A1 | 10/2004 | Carmeli et al. |
| 2004/0249975 A1 | 12/2004 | Tuck et al. |
| 2004/0258003 A1 | 12/2004 | Kokot et al. |
| 2005/0013280 A1 | 1/2005 | Buddhikot et al. |
| 2005/0044350 A1 | 2/2005 | White et al. |
| 2005/0050317 A1 | 3/2005 | Kramer et al. |
| 2005/0058112 A1 | 3/2005 | Lahey et al. |
| 2005/0080907 A1 | 4/2005 | Panasyuk et al. |
| 2005/0108412 A1 | 5/2005 | Sjollema et al. |
| 2005/0108517 A1 | 5/2005 | Dillon et al. |
| 2005/0125663 A1 | 6/2005 | Funk |
| 2005/0132030 A1 | 6/2005 | Hopen et al. |
| 2005/0144186 A1 | 6/2005 | Hesselink et al. |
| 2005/0144481 A1 | 6/2005 | Hopen et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0193075 A1 | 9/2005 | Haff et al. |
| 2005/0198380 A1 | 9/2005 | Panasyuk et al. |
| 2005/0210150 A1 | 9/2005 | Bahl |
| 2005/0232161 A1 | 10/2005 | Maufer et al. |
| 2005/0246445 A1 | 11/2005 | Panasyuk et al. |
| 2005/0256923 A1 | 11/2005 | Adachi |
| 2005/0262357 A1 | 11/2005 | Araujo et al. |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0225130 A1 | 10/2006 | Chen et al. |
| 2007/0130334 A1 | 6/2007 | Carley |
| 2007/0169179 A1 | 7/2007 | Narad |
| 2007/0206621 A1 * | 9/2007 | Plamondon et al. .......... 370/413 |

FOREIGN PATENT DOCUMENTS

| | | |
|---|---|---|
| CN | 1410905 A | 4/2003 |
| EP | 1045553 | 10/2000 |
| EP | 1134942 | 9/2001 |
| EP | 1427133 | 6/2004 |
| EP | 1432209 | 6/2004 |
| JP | 07302237 | 11/1995 |
| JP | 08006910 A | 1/1996 |
| JP | 10178450 | 6/1998 |
| WO | WO-01/47185 A2 | 6/2001 |
| WO | WO-02/23362 A1 | 3/2002 |
| WO | WO-03/048936 A1 | 6/2003 |
| WO | WO-03/083692 | 10/2003 |
| WO | WO-2005024567 A2 | 3/2005 |
| WO | WO-2005048106 | 5/2005 |
| WO | WO-2006012612 | 2/2006 |
| WO | WO-2006020823 | 2/2006 |

OTHER PUBLICATIONS

Office Action for European Application No. 05776653.7. Dated Oct. 5, 2007. 7 pages.
Non Final Office Action dated Jan. 24, 2008 pertaining to U.S. Appl. No. 10/988,004. 6 pages.
Office Action for U.S. Appl. No. 11/039,946 mailed on Jun. 23, 2008, 11 pages.
International Search Report for PCT/US2005/022884, mailed on Jul. 8, 2008. (2 pages).
Written Opinion of the ISA for PCT/US2005/022884, mailed on Jul. 8, 2008 (6 pages).
EP Communication for EP Patent Application No. 07007414.1 dated Jun. 5, 2008. (6 pages).
EP Communication from EP Patent Application No. 05 785 297.2, dated May 18, 2007, 2 pages.
European Search Report for European Patent Application No. EP 07007414 dated Jul. 16, 2007. (2 pages).
Final Office Action dated Dec. 9, 2008 pertaining to U.S. Appl. No. 11/187,562. 15 pages.
Final Office Action dated Dec. 23, 2008 pertaining to U.S. Appl. No. 11/188,279. 12 pages.
International Search Report for PCT/US2005/028663, Mailing date: Nov. 16, 2005. 3 pages.
International Search Report to PCT/US04/37918, mailed on Apr. 27, 2008, 1 page.
International Search Report to PCT/US2005/026296, mailed on Jan. 31, 2006, 5 pgs.
Ipswitch Inc., WSFTP User's Guide, Chapter 8: Security, Jun. 25, 2003, 8 pages.
Non Final Office Action dated Jun. 10, 2008 pertaining to U.S. Appl. No. 11/187,562. 15 pages.
Non Final Office Action dated Aug. 5, 2008 pertaining to U.S. Appl. No. 11/161,091. 17 pages.
Non Final Office Action dated Aug. 20, 2008 pertaining to U.S. Appl. No. 11/161,092. (16 pages).
Non Final Office Action dated Oct. 28, 2008 pertaining to U.S. Appl. No. 11/161,656. 21 pages.
Non Final Office Action dated Dec. 11, 2007 pertaining to U.S. Appl. No. 10/683,881. 10 pages.
Non Final Office Action dated Jun. 26, 2008 pertaining to U.S. Appl. No. 11/188,279. 12 pages.
Notice of Allowance dated Sep. 18, 2008. U.S. Appl. No. 10/988,004 5 pgs.
Office Action dated Sep. 26, 2008 from Chinese Application No. 200480040249.X corresponding to U.S. Appl. No. 10/988,004 22 pgs.
Written Opinion of the International Searching Authority to PCT/US04/37918, mailed on Apr. 27, 2005, 7 pages.
Written Opinion of the International Searching Authority to PCT/US2005/026296, mailed on Jan. 31, 2006.
Written Opinion of the International Searching Authority to PCT/US2005/026300; Mailed on Dec. 16, 2005, 7 pages.
Written Opinion of the International Searching Authority to PCT/US2005/028663; Mailed on Nov. 16, 2005, 7 pages.
Examination report for EP appl. 05776653.7 dated Apr. 20, 2009.
Examination report for AU appl. 2005272779 dated Apr. 23, 2009.
Office action for U.S. Appl. No. 11/161,091 dated Feb. 18, 2009.
Office Action for U.S. Appl. No. 11/161,092 dated Feb. 12, 2009.
Office Action for U.S. Appl. No. 11/161,093 dated Jan. 2, 2009.
Office Action for U.S. Appl. No. 11/187,562 dated Apr. 27, 2009.
Office Action for U.S. Appl. No. 11/187,512 dated Mar. 3, 2009.
Advisory Action for U.S. Appl. No. 11/039,946 dated Mar. 24, 2009.
Office Action for U.S. Appl. No. 11/039,946 dated Jan. 23, 2009.
Office Action for U.S. Appl. No. 11/039,946 dated Jun. 23, 2009.
Office action for U.S. Appl. No. 11/161,091 dated Aug. 3, 2009.
Exam Report for AU appln 2005272779 dated Apr. 23, 2009.
Exam Report for EP appln 05776653.7 dated Apr. 20, 2009.
Exam Report for AU appln 2005266943 dated May 14, 2009.
Exam Report for AU appln 2005266945 dated Jul. 21, 2009.
Advisory Action for U.S. Appl. No. 11/161,091 dated May 6, 2009.
Notice of Allowance for U.S. Appl. No. 11/161,092 dated Jun. 11, 2009.
Advisory Action for U.S. Appl. No. 11/161,092 dated Apr. 24, 2009.
Office Action for U.S. Appl. No. 11/161,093 dated Jun. 19, 2009.
Advisory Action for U.S. Appl. No. 11/161,656 dated Jul. 29, 2009.
Office Action for U.S. Appl. No. 11/161,656 dated May 13, 2009.
Office action for U.S. Appl. No. 11/161,091 dated Feb. 24, 2010.
Office Action for U.S. Appl. No. 11/161,093 dated Feb. 22, 2010.
Office Action for U.S. Appl. No. 11/161,093 dated Sep. 2, 2009.
Examination report for EP Appl. 05785297.2 dated Jun. 19, 2009.
Office Action for U.S. Appl. No. 11/187,512 dated Sep. 15, 2009.
Advisory Action for U.S. Appl. No. 11/161,093 dated Dec. 14, 2009.
Advisory Action for U.S. Appl. No. 11/161,093 dated Nov. 16, 2009.
Exam Report for EP appln 070074141 dated Nov. 17, 2009.
Office Action for CN appln 200580034849.X dated Sep. 25, 2009.
Notice of Allowance for U.S. Appl. No. 11/161,656 dated Sep. 18, 2009.
Office Action for U.S. Appl. No. 11/187,512 dated Dec. 23, 2009.
Notice of Allowance for U.S. Appl. No. 11/188,279 dated Jun. 29, 2009.
Office Action for U.S. Appl. No. 11/161,090 dated Feb. 4, 2009.
Office Action for CN appl. 00480040249.X dated Jun. 19, 2009.
Office Action for CN appl. 200580028535 dated Jan. 15, 2010.
Notice of Allowance for U.S. Appl. No. 11/039,946, dated Mar. 7, 2010.
Office Action for CN appl. 200580030928.3 dated Apr. 23, 2010.
Office Action for U.S. Appl. No. 11/187,512 dated Jun. 22, 2010.
Office Action for JP appl. 2006-539930 dated Feb. 12, 2010.
Office Action for CN appl. 200580034849X dated Apr. 7, 2010.
Office Action for U.S. Appl. No. 11/188,274 dated Mar. 29, 2010.
Office Action for U.S. Appl. No. 11/188,274 dated Sep. 8, 2010.
Restriction Requirement for U.S. Appl. No. 11/161,093 dated Jul. 26, 2010.
Notice of Acceptance for AU appl. 2005272779 dated May 26, 2010.
Notice of Acceptance for AU appl. 2005266943 dated May 28, 2010.
Office Action for CN Appl. 20050034849X dated Aug. 3, 2010 (9 pages).
Office Action for IN Appl. 1514KOLNP2006 dated Sep. 7, 2010 (3 pages).
Office Action for JP Appl. 2007-048002 dated Nov. 1, 2010. (7 pages) (English Abstract).
Office Action for JP Appl. 2007-048003 dated Nov. 1, 2010. (7 pages) (English Abstract).
Office Action for JP Appl. 2007-519353 dated Jul. 12, 2010. (6 pages) (English Abstract).
Office Action for JP Appl. 2007-522841 dated Sep. 10, 2010. (9 pages) (English Abstract).
Office Action for U.S. Appl. No. 11/188,274 dated Mar. 29, 2010. (15 pages).
Office Action for JP Appl. 2007-525810 dated Aug. 4, 2010. (9 pages) (English Abstract).
Yoshikazu Kobayashi, VPN service introduction, Computer & Network LAN, vol. 21, No. 3 Mar. 1, 2003, pp. 25-40. (19 pages) (English Abstract).
Teruhara Serada, "SSL VPN", N+1 Network LAN, vol. 21, No. 3, Mar. 1, 2003, pp. 25-40. (19 pages) (English Abstract).
Office Action for U.S. Appl. No. 11/188,274 dated Sep. 8, 2010. (19 pages).

Restriction Requirement for U.S. Appl. No. 11/161,093 dated Jul. 26, 2010. (9 pages).

Noriaki Kobayashi, "Internet VPN", N+1 Network Guide, vol. 3, No. 9, Oct. 1, 2003, pp. 44-49. (9 pages) (English Abstract).

Office Action for U.S. Appl. No. 11/161,093 dated Oct. 1, 2010. (10 pages).

Office Action for U.S. Appl. No. 12/557,497 dated Nov. 19, 2010. (25 pages).

Office Action for U.S. Appl. No. 11/161,090 dated Aug. 15, 2008. (24 pages).

Office Action for U.S. Appl. No. 11/161,090 dated Feb. 4, 2009. (27 pages).

Office Action for U.S. Appl. No. 11/161,090 dated May 28, 2009. (30 pages).

Office Action for U.S. Appl. No. 11/161,090 dated Jan. 6, 2010. (26 pages).

Office Action for U.S. Appl. No. 11/161,090 dated Jun. 10, 2010. (28 pages).

Office Action for U.S. Appl. No. 11/161,090 dated Oct. 15, 2009. (29 pages).

* cited by examiner

SYSTEMS AND METHODS FOR PROVIDING A VPN SOLUTION

RELATED APPLICATIONS

This application is a continuation of and claims priority to U.S. patent application Ser. No. 10/988,004, filed on Nov. 12, 2004, entitled "SYSTEM, APPARATUS AND METHOD FOR ESTABLISHING A SECURED COMMUNICATIONS LINK TO FORM A VIRTUAL PRIVATE NETWORK AT A NETWORK PROTOCOL LAYER OTHER THAN AT WHICH PACKETS ARE FILTERED", which claims priority to U.S. Provisional Patent Application No. 60/524,999 filed on Nov. 24, 2003, entitled "THIRD GENERATION VPN SOLUTION," all of which are incorporated herein by reference in their entirety for all purposes.

FIELD OF THE INVENTION

The present invention relates generally to secured communication networks. More particularly, the present invention relates to a system, apparatus and a method for establishing a secured communications link between a remote device and a gateway device, whereby at least the remote device (e.g., such as a remote computing device) is configured to capture and redirect packet traffic at that remote device, and to modify the packets for minimizing latency of encrypted packet traffic for real-time applications.

BACKGROUND OF THE INVENTION

Internet Protocol Security ("IPsec") and Secure Sockets Layer. ("SSL") are examples of conventional encryption protocols that are used to establish virtual private networks ("VPNs") over a public communications network, such as the Internet, to ensure that only authorized users can access data in the VPNs. While functional, traditional VPNs implementing these and other conventional encryption protocols have several drawbacks.

A drawback to implementing IPsec, for example, is that most firewalls cannot effectively route IPsec-encrypted packet traffic with minimal effort, especially those performing network address translation ("NAT"). Although NAT traversal techniques exist to pass IPsec-encrypted packets through NAT firewalls, these techniques limit IPsec-encrypted packets to a couple of ports (e.g., port 80 and 443), thereby forming bottlenecks. Another drawback is that VPNs implementing IPsec require that an address assigned to a remote computing device be visible by a private network to which that remote device is connected, giving rise to a vulnerability to certain breaches in security. For example, a worm infecting a client in the private network can use the visible address of the remote device to propagate itself into a private network including that remote device. At least some of the drawbacks of IPsec-based VPNs are due to performing both packet inspection and encryption at the network layer, such as at the Ethernet frame-level.

One drawback to implementing SSL, for example, is that this protocol is typically limited to web applications, thereby precluding the use of numerous other applications that are not browser-based. Another drawback is that SSL-based VPNs do support a wide range of routing protocols. Consequently, SSL-based VPNs cannot generally support real-time applications, such as voice over IP, or "VoIP," and peer-to-peer applications. At least some of the drawbacks of SSL-based VPNs are due to performing both packet inspection and encryption at the transport layer (or the applications layer), which limits routing protocols to, for example, User Data Protocol ("UDP") and Transmission Control Protocol ("TCP").

Thus, there is a need for a system, an apparatus and a method to overcome the drawbacks of the above-mentioned implementations of encryption protocols in VPNs, and in particular, to establish a secured communications link from a remote computing device to a private network by capturing and redirecting packet traffic at the remote device and by modifying the packets to at least minimize the latency of encrypted packet traffic for real-time applications.

SUMMARY OF THE INVENTION

A system, apparatus and a method for implementing a secured communications link at a layer other than that at which packets are filtered are disclosed. In one embodiment, a computer system is configured to form a virtual private network ("VPN") and comprises an address inspection driver to identify initial target packet traffic addressed to a target server. Also, the computer system includes a pseudo server module to receive rerouted initial target packet traffic from the address inspection driver. The pseudo server module is configured to convey packet regeneration instructions to a VPN gateway. The address inspection driver functions to identify additional target packet traffic addressed to the target server and routes the additional target packet traffic to the pseudo server. In one embodiment, the pseudo server is configured to strip header information from the additional target packet traffic to form a payload, and thereafter, to route the payload to the target server.

A method is disclosed, according to another embodiment of the present invention, whereby the method secures communications with a remote client computing device by establishing a virtual private network. The method comprises generating packet traffic with a communication application running on a client computing device, identifying at the client computing device target packet traffic of the packet traffic that is addressed to a target server, forming a secure communications link between a pseudo server module on the computing device and the target server, directing additional packet traffic addressed to the target server to the pseudo server module, sending an acknowledgment to the communication application upon receipt of the additional packet traffic rerouted to the pseudo server module, and routing a payload to the target server.

In yet another embodiment, a virtual private network comprises a client machine configured as a pseudo server machine with respect to a communication application running on the client machine. The communication application is configured to receive packet traffic acknowledgements from the pseudo server machine. A virtual private network gateway is included and is operative with a server machine to function as a client machine with respect to the pseudo server machine, thereby facilitating secure communications between the client machine and the server machine.

BRIEF DESCRIPTION OF THE DRAWINGS

A more complete understanding of the present invention is apparent and more readily appreciated by reference to the following Detailed Description and to the appended claims when taken in conjunction with the accompanying Drawings wherein:

DETAILED DESCRIPTION OF EXEMPLARY EMBODIMENTS

Figure 1:
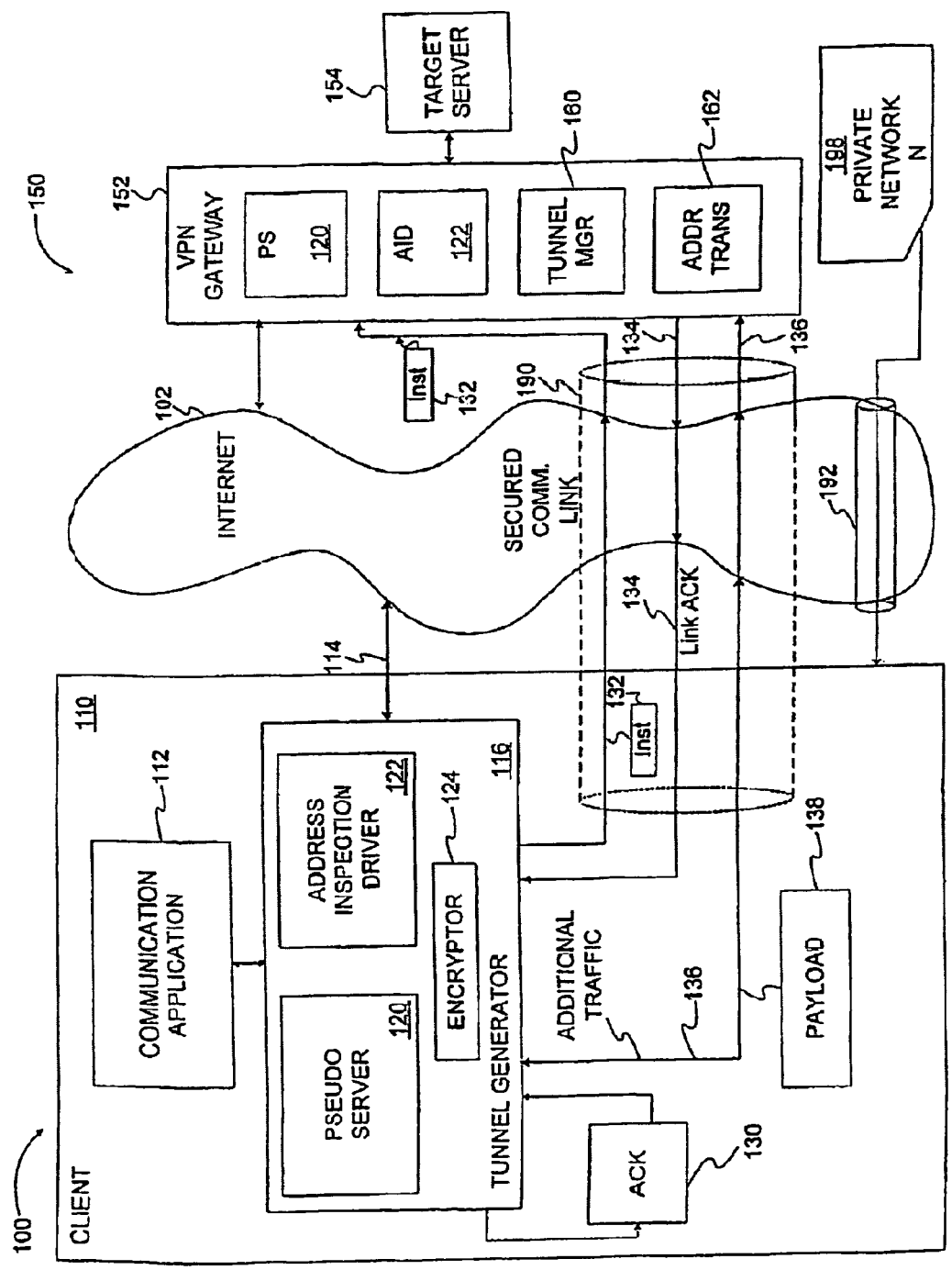
FIG. 1 is a diagram illustrating a virtual private network ("VPN) system for establishing a secured communications link between a remote computing device and a VPN gateway computing device, according to one embodiment of the present invention.

FIG. 1 is a diagram illustrating a virtual private network ("VPN") system for establishing a secured communications link between a remote computing device and a VPN gateway computing device, according to one embodiment of the present invention. A virtual private network 100 includes a remote client computing device ("client") 1 10 coupled via a secured communications link ("secured comm. link") 190 to private network 150 for exchanging encrypted data. Remote client computing device 110 is configured to capture and reroute packet traffic associated with one or more virtual private networks private networks ("VPNs") at or near the network layer (i.e., Layer 2 of the Open System Interconnection model, or "OSI" model). By capturing and inspecting packets at the network layer, remote client computing device 110 is able to inspect a wide range of network traffic including, for example, Internet Protocol ("IP"), TCP, UDP, Internet Control Message Protocol ("ICMP"), Generic Routing Encapsulation ("GRE) techniques, Apple talk, Netbios, etc. Further, remote client computing device 110 can generate secured communications link 190 (or "tunnel") at or near the transport layer (i.e., Layer 4), thereby permitting encrypted packets to pass through network address translation ("NAT")-based firewalls and network devices. In at least one embodiment, private network 150 assigns an address to remote client computing device 110 that can be concealed from computing devices (e.g., target server 154) in that private network, thereby reducing exposure of remote client computing device 110 to security threats, such as worms. In a specific embodiment, remote client computing device 110 is configured to modify packets by, for example, stripping header information prior to transport via secured communications link 190, thereby minimizing latency of encrypted packet traffic in real-time applications.

Although not shown, remote client computing device 110 includes a processor and a memory for executing and storing programs instructions, respectively, for running various user-level computer software applications (e.g., Microsoft Outlook). Remote client computing device 110 includes a communication application 112 as an intermediary to exchange data between the computer software applications to private network 150. Examples of communication application 112 are telnet, File Transfer Protocol ("FTP"), Simple Mail Transfer Protocol ("SMTP"), Hypertext Transfer Protocol ("HTTP") and the like.

Also, remote client computing device 110 includes a tunnel generator 116 configured to generate at least one end of secured communications link 190. Tunnel generator 116 includes an address inspection driver ("AID") 122, a pseudo server ("PS") 120 and an encryptor 124, each of which is composed of either hardware or software, or both. Address inspection driver ("AID") 122 is disposed at or near the network layer to capture and inspect packet traffic, such as network (e.g., Ethernet) frames, traversing the one or more network adapters of remote client computing device 110. During inspection of, for example, the IP headers of captured packets, address inspection driver 122 determines whether the captured packets are destined for private network 150. If a packet is not bound for private network 150, then address inspection driver 122 forwards the packet as an unencrypted packet via path 114 out into Internet 102.

But when packet traffic is identified as being destined to private network 150 (i.e., "target packet traffic"), address inspection driver 122 filters that packet traffic from passing out onto path 114. Address inspection driver 122 reconfigures the filtered packets (i.e., the target packet traffic) as "incoming packets" to reroute them to a traffic port on pseudo server 120. In some embodiments, that traffic port can be a "well known port" on remote client computing device 110, where a well known port can be any of port numbers 0 to 1024, or the like. In addition, address inspection driver 122 is configured to also send control information encapsulated as control packets along with the rerouted filtered packets to pseudo server 120. Note that it is not necessary to generate a control packet for every rerouted filtered packet as pseudo server 120 can detect other packets to which the same control information will be applicable. While address inspection driver 122 can be implemented in accordance with the Network Driver Interface Specification ("DIS"), it can also be implemented in program instructions operable with any known operating system, such as UNI, Linux, Microsoft Windows™ and the like.

Pseudo server ("PS") 120 is disposed at or near the transport layer to receive encrypted packet traffic from secured communications link 190 and to transmit (i.e., redirect) encrypted packet traffic that is rerouted from address inspection driver 122. In some embodiments, pseudo server 120 is configured to modify packets by, for example, stripping header information prior to transport via secured communications link 190. In operation, pseudo server 120 monitors (or "listens" to) its traffic ports waiting to accept incoming rerouted packets and any control packets that get passed from address inspection driver 122. Pseudo server 120 associates the control packets with respective rerouted packets, and then creates a message frame 132 for transmission to private network 150. Message frame 132 includes, among other things, regeneration instructions for reconstructing the packets at private network 150. Note that message frame 132 is generally then encrypted and sent over secured communications link 190 to private network 150.

Note that when pseudo server 120 receives encrypted packet traffic from secured communications link 190 rather than transmitting it, pseudo server 120 provides for the decryption of those packets by passing them to encryptor 124. Then, pseudo server 120 passes the decrypted packets to address inspection driver 122, along with control information, if any. In response, address inspection driver 122 reconfigures those decrypted packets signals as "incoming packets" to reroute them to communication application 112.

In at least one embodiment, pseudo server 120 is configured to modify outgoing packets to form modified packets. In this example, pseudo server 120 can strip header information from the outgoing packets bound for private network 150. Examples of header information that can be stripped include TCP headers, IP headers, link layer headers, and the like. The residual data of the packets from which the header information is stripped is referred to as "modified packets," each including a payload. A modified packet is depicted in FIG. 1 as "payload" 138. Further, message frame 132 includes regeneration instructions to reconstruct the stripped header information for regenerating the pre-modified packets in private network 150. In some cases, message frame 132 can include authentication information. Once message frame 132 is understood by at least one entity of private network 150, a link acknowledgment ("ACK) 134 is returned to tunnel generator 116. In a specific embodiment of the present invention, pseudo server 120 forms modified packets as pseudo-UDP packets, which constitute additional traffic 136 composed of modified packets 138 to be conveyed to private network 150. As such, tunnel generator 116 generates an acknowledgement 130 when sending modified packet 138 to prevent delays associated with acknowledgements required by TCP standards. Acknowledgement 130 can be implemented as a "false acknowledgement" so that remote client computing device need not wait for an acknowledgment (e.g., a TCP acknowledgement) when sending a modified packet 138. Accordingly, modified packets 138 are TCP packets that can behave as UDP packets. As such, secured communications link 190 can be referred to as a "virtual TCP connection" rather than a standard TCP connection as the packets traversing link 190 are UDP packets masquerading as TCP packets. In one embodiment, tunnel generator 116 determines that traffic target packets includes a certain type of data, such as video or audio data, that is time sensitive (i.e., part of a exiting and real-time application) and selectively modifies those traffic target packets to form modified packets 138.

Encryptor 124 is configured to establish a connection with private network 150 and to encrypt and decrypt packets entering, respectively, remote client computing device 110. For example, encryptor 124 can establish a connection using Hyper Text Transfer Protocol over Secure Socket Layer ("HTTPS"), Proxy HTTPS and like connection protocols. With these connection protocols being operative generally at a transportation layer (or a higher layer), encryptor 124 establishes a connection that is suitable for traversing NAT-based firewalls and bridges. Once a connection (e.g., HTTPS) is established, the payload of the packets bound for private network 150 is encrypted using, for example, Secure Socket Layer ("SSL"), Transport Layer Security ("TLS") Protocol, or the like. Encryptor 124 can encrypt an entire packet including header information, such as an IP header, if not stripped.

Private network 150 includes a VPN Gateway 152 and a target server 154, which represents any computing device (as either a server or a client) with which remote client computing device 110 establishes communications. VPN Gateway 152 is an intermediary computing device that coordinates establishment of secured communications link 190 with remote client computing device 1 10. VPN Gateway 152 exchanges communications between remote client computing device 1 10 and target server 154. Further, VPN Gateway 152 is similar, at least in some respects, to remote client computing device 110. Namely, VPN Gateway 152 includes a processor, a memory and an encryptor, all of which are not shown, as well as address inspection driver ("AID") 122 and a pseudo server ("PS")' 120. AID 122 and PS 120 have similar functionality and/or structure as those described in relation to remote client computing device 1 10.

VPN Gateway 152 also includes a tunnel manager ("Tunnel Mgr") 160 and an address translator ("Addr Trans") 162. Tunnel manager 160 is configured to download as a software program at least pseudo server 120 and address inspection driver 122. Also, tunnel manager 160 is configured to provide configuration information. The configuration information can include a range of addresses that are associated with private network 150 so that remote client computing device 110 can select which packets to filter out as target packet traffic. Further, tunnel manager 160 is also configured to receive message frame 132 and to regenerate packets to, for example, include IP header information and/or the assigned address of remote client computing device 110.

Address translator 162 is configured to provide a NAT process, and specifically, a reverse NAT process to hide the assigned address of remote client computing device 110 from target server 154. To illustrate, consider the following example in which a TCP connection is created from remote client computing device 110 to target server 154, which has a destination address of 192.168.1.100. First, a TCP SYN packet is generated for address 192.168.1.100. Tunnel generator 116 passes this SYN packet over secured communications link 190. VPN Gateway 152 examines the packet as it arrives and determines that it is a SYN packet for 192.168.1.100. In turn, VPN Gateway 152 generates a new SYN (i.e., replays or regenerates that packet) destined for 192.168.1.100, with a source address appearing to indicate that the new SYN packet originated from 192.168.1.2, which is the private address for VPN Gateway 152. After target server 154 at address 192.168.1.100 generates a SYN-ACK packet, VPN Gateway 152 then receives this packet. Then, a new SYN-ACK packet is in turn conveyed over secured communications link 190 back to tunnel generator 116, which then generates a SYN-ACK packet. This packet appears to originate from target server 154 at address 192.168.1.100, as viewed by remote client computing device 110. In short, VPN Gateway 152 is able to reverse map reply packets and acknowledgments or any other packet as part of that protocol by using unique source port numbers of VPN Gateway 152. In this manner, remote client computing device 110 is able to connect to any foreign private network and still maintain IP invisibility. Such invisibility can be on an application-by-application basis. In some cases, VPN Gateway 152 can optionally enable address visibility by sending an assigned private address for a successfully established secured communications link to a tunnel generator, which in turn, assigns that private address to the remote client computing device in which it resides. But note that the visibility of the address of remote client computing device is not mandatory, but can be optionally enabled, for example, to facilitate certain applications, such as voice applications or any other peer-to-peer applications.

In a specific embodiment, remote client computing device 110 can establish another secured communications link 192 (which is similar to that of link 190) to another private network ("n") 198 simultaneous to the pendency of secured communications link 190. As such, remote client computing device 110 can simultaneously establish multiple VPN tunnels or secured communications links to different private subnets or networks, especially in cases where destination network addresses overlap partially or completely. Note that while Internet 102 is exemplified as a communications network through which secured communications link 190 can be established in accordance with an embodiment of the present invention, remote client computing device 110 can employ tunnel generator 116 to form tunnels to any type of communications networks, such as a wireless network. It will also be understood that the embodiments of the present invention may be implemented using any routing protocol (e.g., Internet Protocol version 6, "IPv6"), in any packet switching technology (e.g., an Ethernet network), over any communications media (e.g., Ethernet cabling, wireless, optical fibers, etc.) and for use with any computing device (e.g., a wireless station) as an end station, without deviating from the scope and the spirit of the present invention.

Figure 2:
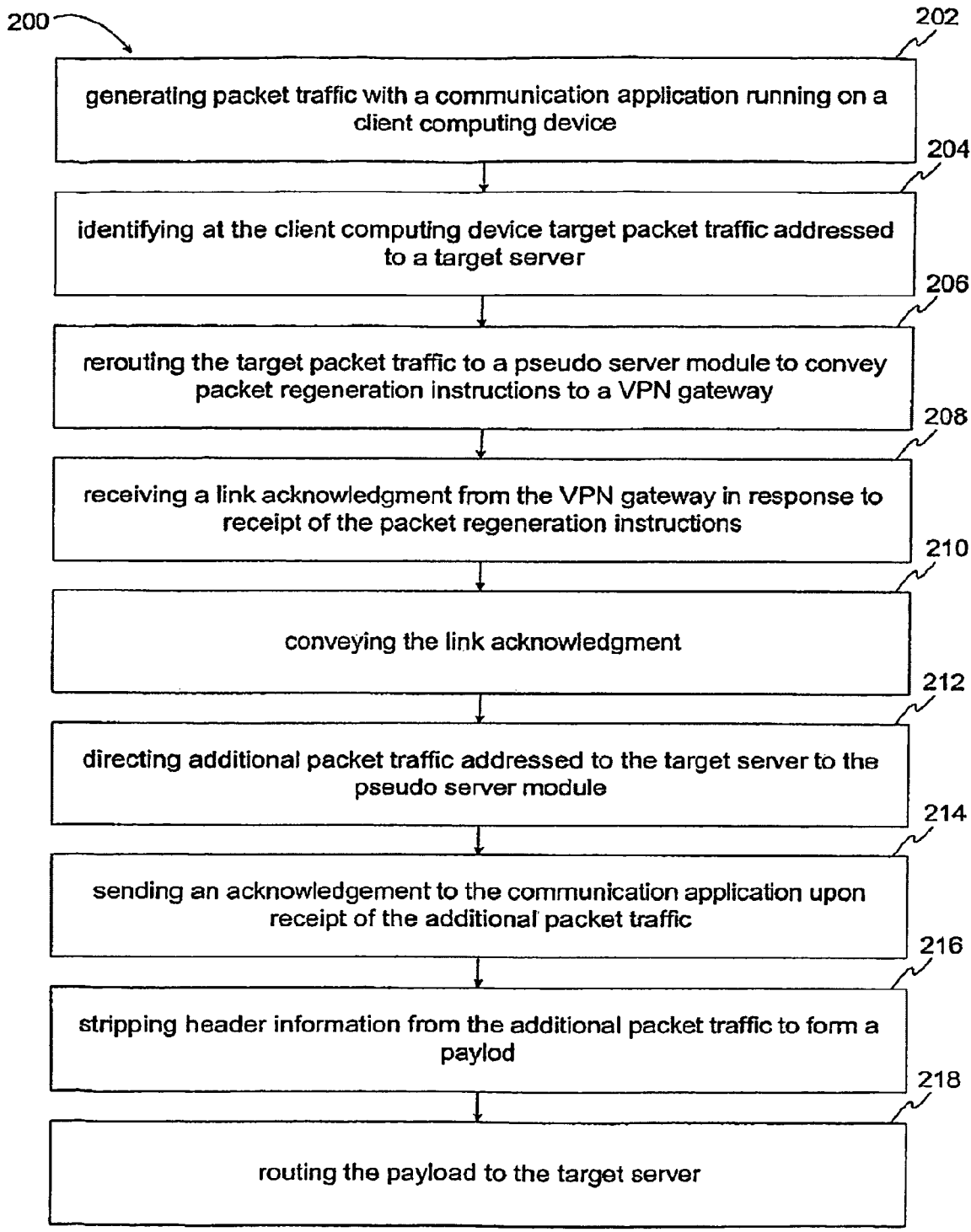
FIG. 2 is a flow diagram depicting an exemplary method of communicating packets over a secured communications link, according to one embodiment of the present invention.

FIG. 2 is a flow diagram 200 depicting an exemplary method of communicating packets over a secured communications link, according to one embodiment of the present invention. At 202, a communications application running on a remote client computing device, such a telnet application, generates packet traffic in response to a request by a user-level application to access a private network. The client computing device at 204 identifies target packet traffic bound for a target server. At 206, the target packet traffic is rerouted to a pseudo server module to at least convey packet regeneration instructions to, for example, a VPN Gateway. The client computing device, receives a link acknowledgement sent from the VPN Gateway at 208, thereby signaling, for example, that a secured communications link between the client and the private network is operational. In turn, the link acknowledgment is conveyed at 210 to the communications application to initiate packet transfer. At 212, additional packet traffic addressed to the target server can be directed to the pseudo server module from, for example, an address inspection driver. Thereafter, at 214, an acknowledgement can be sent to the communications application upon receipt of the additional packet traffic at the pseudo server module prior to transmission to the target server, according to at least one embodiment of the present invention. In some embodiments, header information is stripped from the additional packet traffic to form a payload at 216. Then, the payload at 218 is routed to the VPN Gateway.

Figure 3:
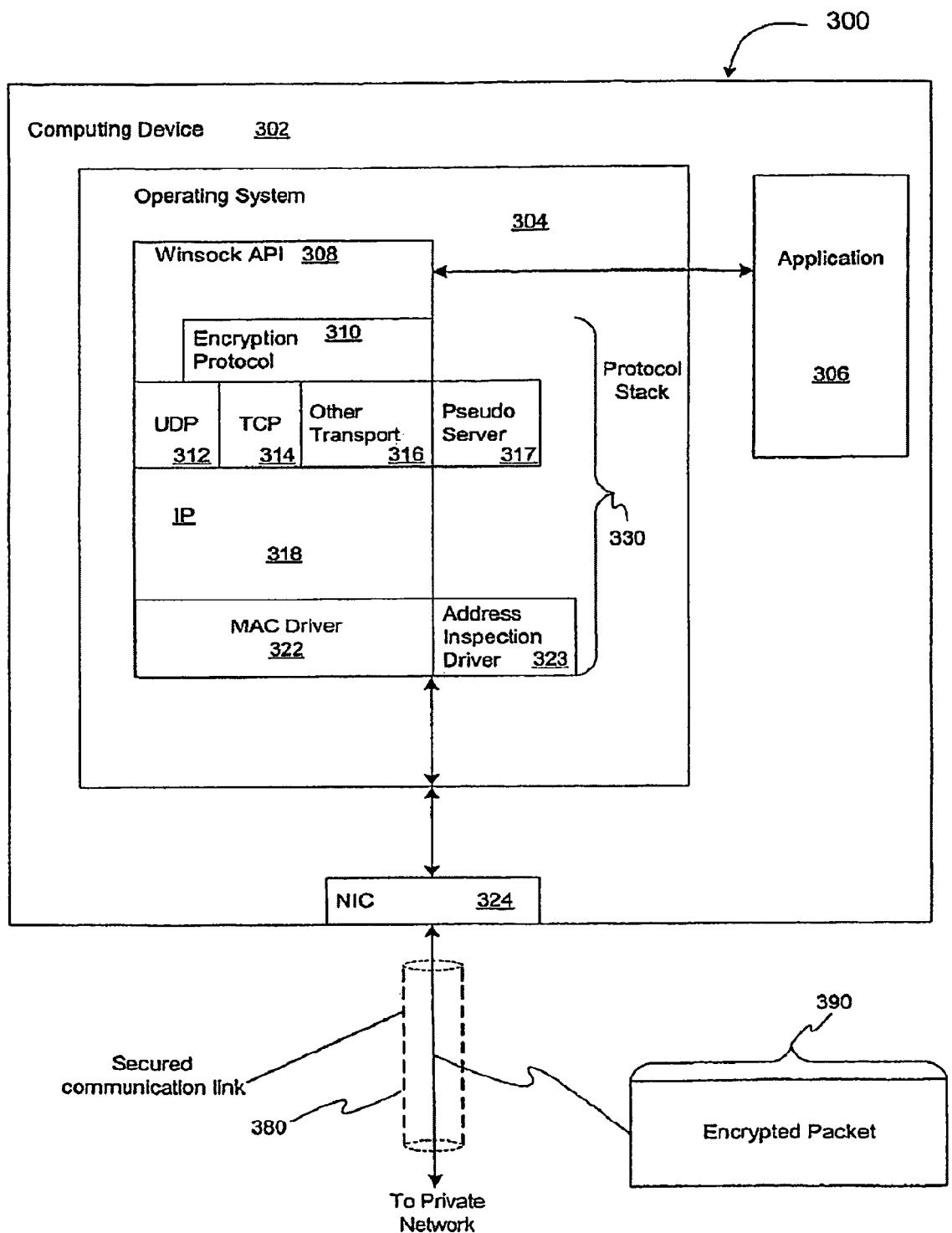
FIG. 3 is a block diagram for describing a remote client computing device in accordance with one embodiment of the present invention.

FIG. 3 is a block diagram for describing a remote client computing device in accordance with one embodiment of the present invention. Computing device 302 in this example is capable of exchanging encrypted packet traffic 390 with another computing device located, for example, on a private network via a secured communications link 380. In the example shown in FIG. 3, computing device 302 includes an operating system 304 coupled to a network interface card ("NIC") 324, which can be, for example, an Ethernet network adapter. Operating system 304 also includes a protocol stack 310, which can be any set of network protocols for binding high-level protocol layers, such as an application layer, to lower-level protocol layers, such as a physical layer including NIC 324. As shown, protocol stack includes a pseudo server 317, an address inspection driver 323 and an encryption protocol 310 in accordance with a specific embodiment of the present invention.

Protocol stack 310 is shown to include at least a transport layer, a network layer and a link layer. The transport layer includes at least one transport protocol, such as a UDP process 312, a TCP process 314 (i.e., a TCP service) or an optional another type of transport protocol, "other transport" protocol 316, such as "ICMP." FIG. 3 shows that the network layer, which includes an IP process 318 (i.e., an IPv4 or IPv6 service), can be at a next higher layer over the link layer. In this example, pseudo server 317 is disposed at the transport layer and address inspection driver 323 is disposed near the network layer. In particular, address inspection driver 323 is disposed at the data link layer. An encryption protocol 310, such as SSL, can be disposed along side or above pseudo server 317, and is suitable to implement encryptor 124 of FIG. 1. In FIG. 3, encryption protocol 310 is in a layer above TCP process 314.

According to one embodiment of the present invention, protocol stack 310 is a collection of processes embodied in software. In another embodiment, protocol stack 310 and/or its constituents can be embodied in software or hardware, or both. Each process (e.g., TCP 314, IP 318, etc.) of protocol stack 310 is configured to communicate with each other process, such as across layers of protocol stack 310. A higher-level layer, such as the transport layer, can be configured to communicate, for example, via a Winsock API 308 (or any other socket layer program to establish, for example, raw sockets) with an application 306. Winsock API 308 provides an interface with application 306, which can be a telnet application. A lower-level layer, such as either a network layer or a link layer, can be configured to communicate, for example, via a MAC driver 322 with NIC 324. Exemplary interactions between pseudo server 317 and address inspection driver 323 to establish a secured communications link are described next in FIGS. 4 and 5.

Figure 4:
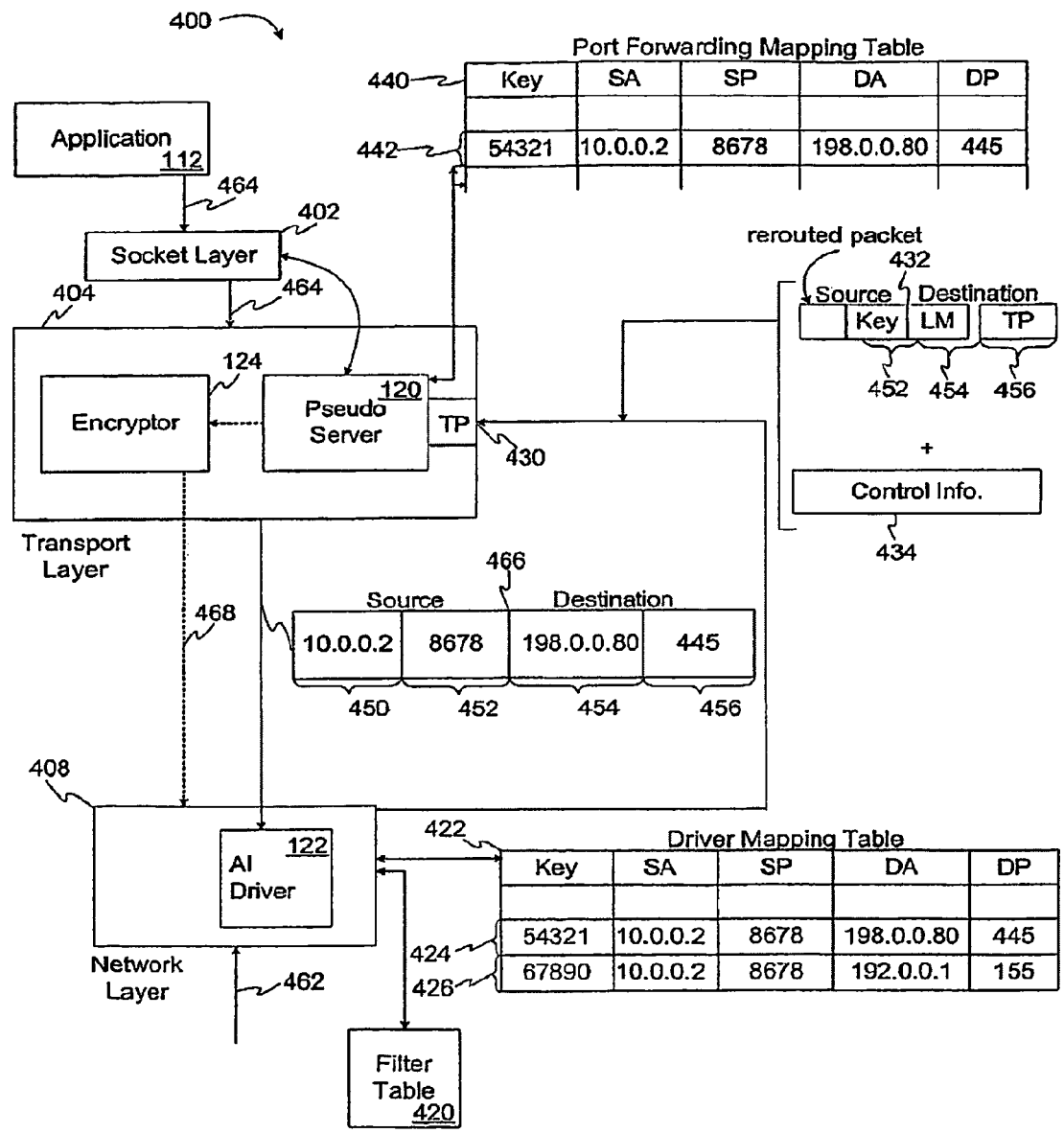
FIG. 4 is a functional block diagram illustrating the interaction between a pseudo server and an address inspection driver when transmitting target packet traffic from a remote client to a private network, according to a specific embodiment of the present invention.

FIG. 4 is a functional block diagram 400 illustrating the interaction between a pseudo server and an address inspection driver when transmitting target packet traffic from a remote client to a private network, according to a specific embodiment of the present invention. In this example, encryptor 124 and pseudo server 120 are disposed at transport layer 404 and address inspection driver ("Al Dm") 122 is disposed at network layer 408. Again, note that in some embodiments address inspection driver resides at the data link layer. Pseudo server 120 is coupled to a port forwarding mapping data structure 440 that maintains packet information, such as a "key," a source address ("SA"), a source port ("SP"), a destination address ("DA"), and a destination port ("DP"). Similarly, address inspection driver 122 maintains a similar data structure depicted as a driver mapping table data structure 422. Further, address inspection driver 122 is also coupled to a filter table 420 that includes configuration information provided by a VPN Gateway. Filter table 420 includes network addresses, such as a source address and a destination address (e.g., 198.0.0.80), an optional subnet mask (not shown), a protocol, such as TCP, UDP, ICMP, etc. (not shown), port information, such as a source port and a destination port, and a unique mapping key to uniquely identify destination information associated with target packet traffic. Pseudo server 120 and address inspection driver 122 synchronize these data structures by exchanging control information, such as in a control packet 434, when a change is made to one of those data structures. An exemplary control packet 434 can be a UDP packet or a packet of any other protocol, and is typically sent with rerouted data packets to pseudo server 120. If some of the control information includes updates to entry 442, such as a change in destination port, than that change is entered. In some cases, the control information includes how the packet should be handled or regenerated at the VPN Gateway.

Consider that application 112 resides on a remote client computing device and is identifiable by a source address of 10.0.02 and a source port of 8678, and a target server (not shown) resides at destination address 198.0.0.80 and destination port 445. If address inspection driver 122 has yet to detect the destination address or port in packet traffic 462, then a destination address and a destination port for that target server is stored in driver mapping table data structure 422. In this case, an entry 424 is made in data structure 422 to include a source address ("SA") as 10.0.0.2, a source port ("SP") as 8678, a destination address ("DA") as 198.0.0.80, and a destination port ("DP") as 445, as well as a "key" that is generated and assigned to the packet traffic by address inspection driver 122. Note that entry 426 signifies that application 112 has formed another secured communications link to another VPN Gateway and that address inspection driver 112 is configured to inspect packet traffic relating to both entries 424 and 426. As such, multiple VPNs can be established concurrently with application 112.

Next, consider that application 112 is generating target packet traffic 464 that is destined for destination address 198.0.0.80 and destination port 445. This target packet traffic 464 passes through a socket layer 402 to pseudo server 120. Socket layer 402 can include a Winsock API, a Winsock provider or any other socket connection provider process (e.g., a programming interface that provides for raw sockets), regardless of operating system. Pseudo server 120 matches entries of data structure 440 to information in target packet traffic 464 to determine whether that packet traffic is part of a VPN. Since an entry in data structure 440 includes a DA and a DP that respectively correspond to 198.0.0.80 and 445, a match is made and pseudo server 120 concludes that packet traffic 464 is to be routed via a secured communications link. Pseudo server 120 then passes target packet traffic 466 to address inspection driver 122, whereby target packet traffic 466 is characterized by source address ("SA") 450, source port ("SP") 452, destination address ("DA") 454 and destination port ("DP") 456. Note that FIG. 4 shows packet 466 and other packets with select address and port information; other packet data, including payload, is omitted for discussion purposes.

Address inspection driver 122 then reconfigures target packet traffic 466 and reroutes it back to pseudo server 120 as rerouted packet 432. In at least one embodiment, address inspection driver 122 reconfigures SP 452 to include a "key," which in this example, is "54321." Also, DA and DP are respectively reconfigured to include a local host or a local machine ("LM") address 454 and a traffic port ("TP") 456. In a specific embodiment, local machine address 454 is 127.0.0.1, which is a loop back address causing rerouted packet 432 to be sent up the OSI protocol stack. Address inspection driver 122 sends rerouted packet 432 up to traffic port ("TP") 430 of pseudo server 120, where TP 430 is a listening port for detecting, for example, TCP packets. In some embodiments, rerouted packet 432 is sent to a TCP traffic port of pseudo server 120 regardless of whether rerouted packet 432 is a UDP packet, such as in the case where pseudo server 120 generates a pseudo-UDP packet as a modified packet. Concurrently (or nearly so), control packet 434 includes a local machine address (not shown) so that it can be sent up the OSI protocol stack to a control port (not shown) of pseudo server 120. In such a case, control packet 434 includes information describing the modifications to a packet to form rerouted packet 432. Thereafter, pseudo server 120 then redirects rerouted packet 432 to encryptor 124 to form an encrypted packet 468 that is passed through a secured communications link.

Figure 5:
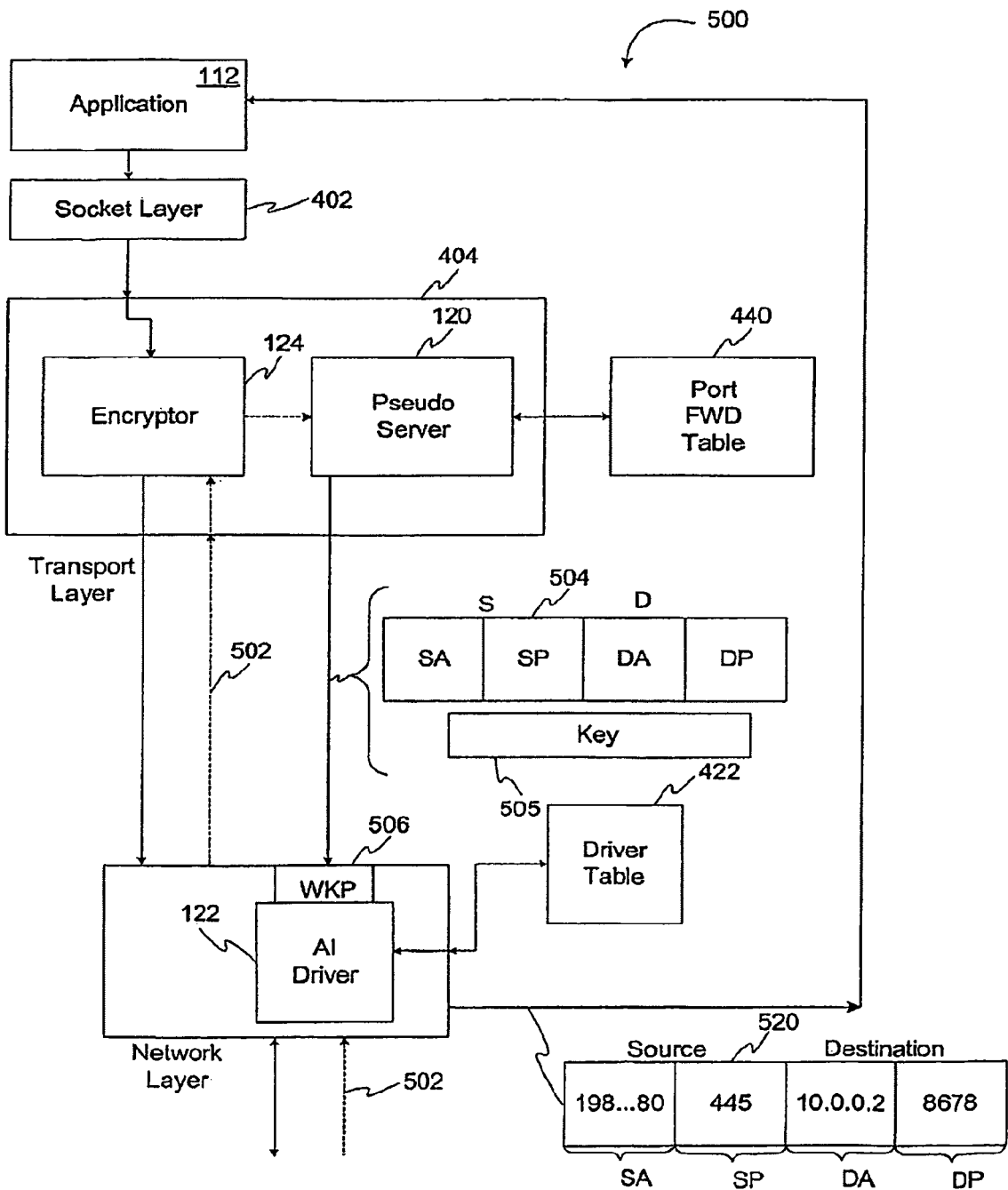
FIG. 5 is a functional block diagram illustrating the interaction between a pseudo server and an address inspection driver after receipt of encrypted packet traffic into a remote client from a private network, according to a specific embodiment of the present invention.

FIG. 5 is a functional block diagram 500 illustrating the interaction between a pseudo server and an address inspection driver after the receipt of encrypted packet traffic into a remote client from a private network, according to a specific embodiment of the present invention. To illustrate the interaction, consider that an encrypted packet 502 is passed through to encryptor 124 for decryption. Then, the decrypted packet is passed to pseudo server 120, which matches at least some of the contents of the decrypted packet against data in data structure ("port fwd table") 440. Consider that a match is made, thereby signifying that the decrypted packet is part of an established VPN. As such, pseudo server 120 provides decrypted packet 504 and an attendant control packet 505, which in this case includes the key associated with packet 504, to a well known port ("WKP") 506 of address inspection driver 122. Thereafter, address inspection driver 122 reconfigures decrypted packet 504 in accordance with information indexed by the key into driver table 422, which is similar to the data structure of FIG. 4. As such, the reconfigured packet will include destination information that identifies application 112. As such, rerouted packet 432 is signaled as an "incoming" (or received) packet 520 and is passed up the protocol stack to application 112.

Figure 6:
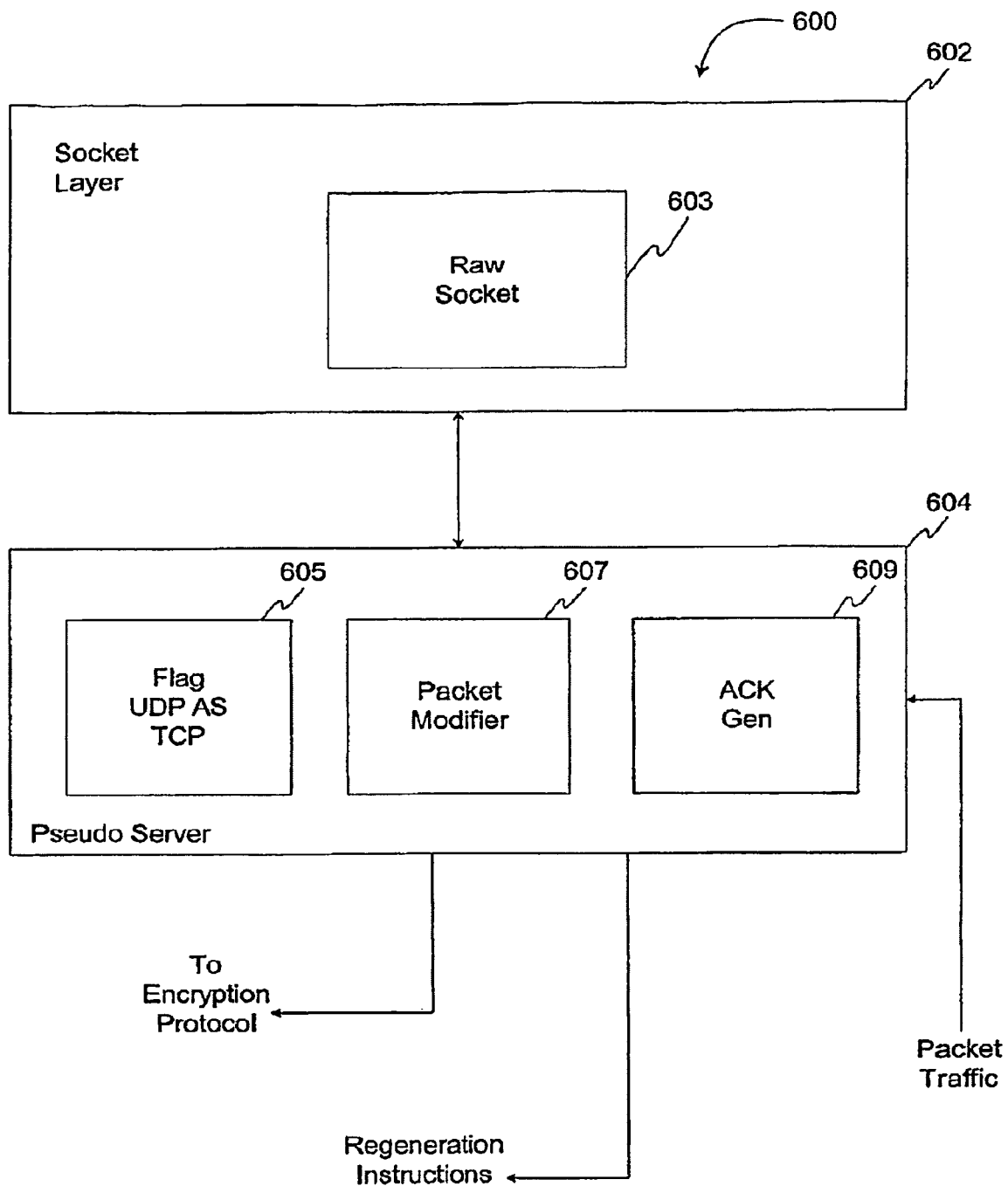
FIG. 6 is a block diagram illustrating various modules of a pseudo server for communicating encrypted packets for real-time and other applications, according to various embodiments of the present invention.

FIG. 6 is a block diagram 600 illustrating various modules of a pseudo server to modify packets for real-time applications, according to at least one embodiment of the present invention. As shown, pseudo server 604 includes a flag-UDP-as-TCP module 605, a packet modifier module 607, and an acknowledgement generator ("ack gen") 609, one or more of which can be simultaneously operative when sending packets through a secure communications link of the present invention. Although real-time packet traffic, such as voice and video, benefits from the performance advantages of a session-less protocol, such as UDP, standard UDP packets are generally difficult to traverse through many firewalls, whereas TCP traffic is not so disadvantaged. In at least one specific embodiment of the present invention, pseudo server 604 is configured to form "pseudo-UDP" packets using modified TCP packets.

Flag-UDP-as-TCP module 605 is configured to flag a UDP packet as a TCP packet in the IP header, which fools the communications network into thinking that the packets are part of a TCP session. Packet modifier 607 is configured to operate with raw socket connection process 603 of socket layer 602. In particular, packet modifier 607 strips header information, such as IP header information, and sends the remaining payload via raw socket connections formed by raw socket connection process 603. As such, regeneration instructions are also sent to describe how to reconstruct packets after those packets pass through a secured communications link with header information stripped out. In one embodiment, the regeneration instructions include information for regenerating header information at the target server so that the target packet traffic can be converted from a first format to a second format. In cases where the first format is associated with Transmission Control Protocol ("TCP") and the second format is associated with User Data Protocol ("UDP"), then the first packet is formatted as a pseudo-UDP (e.g., a UDP packet flagged as a TCP packet), and the second packet is formatted as UDP packet for transmission of, for example, real-time applications.

Acknowledgement generator ("ack gen") 609 is configured to issue "false acknowledgments" in response to TCP representations of UDP packets (i.e., pseudo-UDP packets) being transmitted over the secure communications link. This allows for UDP-like behavior to TCP traffic, in that if the TCP packet (i.e., the pseudo-UDP packet) was lost, no attempt is made by either the transmitting end or the receiving end of the VPN tunnel to synchronize sequence numbers and retransmit that packet. Consequently, the VPN interprets the forwarding of pseudo-UDP packets as the forwarding TCP packets, but with raw sockets on either end of the secured communications link interpreting whether these packets are UDP packets carrying voice (such as RTP) or video.

Various structures and methods for establishing a secured communications link, such as with a pseudo server and an address inspection driver, are described herein. The methods can be governed by or include software processes, for example, as part of a software program. In one embodiment, a pseudo server module and an address inspection driver module are disposed in a software program embedded in a computer readable medium that contains instructions for execution on a computer to implement a secured communications link, according to the present invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that nomenclature selected herein is presented to teach certain aspects of the present invention and is not intended to restrict the implementations of the various embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed:

1. A method for securing, by a client, private network communications to a server via a gateway, the method comprising:
   (a) establishing, by a pseudo server of a device, a secure communications link to a gateway in communication with a server on a private network, the pseudo server operating at a transport layer of a network stack of the device;
   (b) receiving, by an address inspection driver of the device, network traffic generated by an application running on the device, the address inspection driver operating at a layer of the network stack below the transport layer;
   (c) identifying, by the address inspection driver, that the network traffic is addressed to the server;
   (d) communicating, by the address inspection driver, to the pseudo server the network traffic addressed to the server; and
   (e) modifying, by the pseudo server, the network traffic for transmission via the transport layer to the gateway.

2. The method of claim 1, wherein step (a) further comprises establishing by the pseudo server a secure tunnel over the transport layer to the gateway.

3. The method of claim 1, wherein step (b) further comprises operating the address inspection driver at a network layer of the network stack.

4. The method of claim 1, wherein step (b) further comprises operating the address inspection driver at a data link layer of the network stack.

5. The method of claim 1, wherein step (b) further comprises intercepting, by the address inspection driver, the network traffic of the application.

6. The method of claim 1, wherein step (c) further comprises identifying, by the address inspection driver, that the network traffic of the application is destined to the private network.

7. The method of claim 1, wherein step (d) further comprises rerouting, by the address inspection driver, the network traffic to a port listened to by the pseudo server.

8. The method of claim 7, further comprising sending, by the address inspection driver, control information via control packets to the pseudo server, the control information identifying one or more of the following: a local device address, and modifications to a packet to form a rerouted packet.

9. The method of claim 1, wherein step (e) further comprises stripping, by the pseudo server, header information to form the modified network traffic and transmitting the modified network traffic to the gateway.

10. The method of claim 1, wherein step (e) further comprises adding, by the pseudo server, to the modified network traffic regeneration instructions to instruct the gateway on regenerating the stripped header information on the private network.

11. A system for securing by a client communications to a server on a private network via a gateway, the system comprising:
   a pseudo server of a device establishing a secure communications link to a gateway in communication with a server on a private network, the pseudo server operating at a transport layer of a network stack of the device;
   an address inspection driver of the device receiving network traffic generated by an application running on the device, the address inspection driver operating at a layer of the network stack below the transport layer;
   wherein the address inspection driver identifies that the network traffic is addressed to the server and communicates to the pseudo server the network traffic addressed to the server; and
   wherein the pseudo server modifies the network traffic for transmission via the transport layer to the gateway.

12. The system of claim 11, wherein the pseudo server establishes a secure tunnel over the transport layer to the gateway.

13. The system of claim 11, wherein the address inspection driver operates at a network layer of the network stack.

14. The system of claim 11, wherein the address inspection driver operates at a data link layer of the network stack.

15. The system of claim 11, wherein the address inspection driver intercepts the network traffic of the application.

16. The system of claim 11, wherein the address inspection driver identifies that the network traffic of the application is destined to the private network.

17. The system of claim 11, wherein the address inspection driver reroutes the network traffic to a port listened to by the pseudo server.

18. The system of claim 17, wherein the address inspection driver sends control information via control packets to the pseudo server, the control information identifying one or more of the following: a local device address, and modifications to a packet to form a rerouted packet.

19. The system of claim 11, wherein the pseudo server strips header information to form the modified network traffic and transmits the modified network traffic to the gateway.

20. The system of claim 19, wherein the pseudo server adds to the modified network traffic regeneration instructions to instruct the gateway on regenerating the stripped header information on the private network.

* * * * *